United States Patent [19]

Nakagawa et al.

[11] Patent Number: 4,742,255
[45] Date of Patent: May 3, 1988

[54] LINEAR PULSE MOTOR

[75] Inventors: Hiroshi Nakagawa; Toshiki Maruyama; Masaaki Narihisa; Minoru Maeda, all of Ise; Tsuyoshi Tanaka, Mie, all of Japan

[73] Assignee: Shinko Electric Co., Ltd., Tokyo, Japan

[21] Appl. No.: 845,543

[22] Filed: Mar. 28, 1986

[30] Foreign Application Priority Data

Mar. 29, 1985 [JP] Japan ................................. 60-66009
Jun. 19, 1985 [JP] Japan ................................ 60-133349

[51] Int. Cl.$^4$ .......................................... H02K 41/00
[52] U.S. Cl. ..................................................... 310/12
[58] Field of Search ................................... 310/12–14; 318/135

[56] References Cited

U.S. PATENT DOCUMENTS

| 3,716,731 | 2/1973 | Nilsson ................................. 310/13 |
| 4,578,622 | 3/1986 | Nakagawa et al. ..................... 310/12 |
| 4,594,520 | 6/1986 | Miwa et al. ............................ 310/12 |
| 4,623,807 | 11/1986 | Nakagawa ............................. 310/12 |

Primary Examiner—Donovan F. Duggan
Attorney, Agent, or Firm—Kane, Dalsimer, Sullivan, Kurucz, Levy, Eisele and Richard

[57] ABSTRACT

A linear pulse motor including: a stator; a movable member, the stator and the movable member each having a face to oppose to each other; a supporting mechanism for supporting the movable member, the supporting mechanism having a plurality of rolling members rotatably mounted thereon, said rolling members being placed between the stator and the movable member to be in rolling contact with the stator and the movable member so that a gap is formed between said opposing faces of the stator and the movable member to thereby enable the movable member to move parallel to the opposing face of the stator along a line of travel thereof, the supporting mechanism being movable on the stator along said line of travel; and a positive motion transferring mechanism for positively transferring movement of the movable member to the supporting mechanism so that the supporting mechanism is in displacement a half of the movable member, whereby the movable member is moved by generating a magnetic flux between said gap when the linear pulse motor is energized.

5 Claims, 8 Drawing Sheets

LINEAR PULSE MOTOR

BACKGROUND OF THE INVENTION

The present invention relates to a linear pulse motor and more particularly to a guide mechanism for a movable member of a linear pulse motor which may be used as motors for feeding heads of floppy disc drive, electronic printers, etc.

Representative guide mechanisms for a movable member of a linear pulse motor were proposed in U.S. patent application Ser. No. 711,153 entitled "SUPPORTING MECHANISM FOR A MOVABLE MEMBER OF LINEAR PULSE MOTORS" and filed on Mar. 13, 1985, of which disclosure is incorporated herein by reference. FIG. 1 illustrates one of the guide mechanisms, in which a movable member 1 has a teeth portion 1a, as a secondary unit, formed in its lower face and a stator 2 as a primary unit includes a pair of cores 5 and 6 wound with coils 3 and 4, each core having comb-shaped magnetic poles 5a, 5b or 6a, 6b formed in upper faces of respective ends of its legs. The lower faces of the end portions of the legs of each core 5 or 6 are bonded to a permanent magnet 7. Each core 5 or 6 is provided on the upper faces of its legs with an angular guide member 8 or 9 to be directed to corresponding magnetic poles 5a, 5b or 6a, 6b to define a travel path. Further, each of cores 5 and 6 has a supporting member 21 placed on its travel path between the corresponding guide member 8 or 9 and magnetic poles 5a, 5b or 6a, 6b. As clearly shown in FIG. 2, each supporting member 21 has a pair of rollers 18 and 18, rotatably fitted in retaining holes 21b formed through a horizontal flange 21a thereof, and a pair of balls 20 and 20 rotatably fitted in respective retaining recesses 23 and 23 formed in its vertical flange 21c. Each supporting member 21 is in rolling contact by it rollers 18 with the upper face of the core 5 or 6 at its travel path so that it may travel along the travel path, and is stopped at opposite ends of the travel path by stoppers 19 mounted there.

When the movable member 1 is placed on the cores 5 and 6 so that the teeth portion 1a is placed above the magnetic poles 5a, 5b, 6a and 6b, the movable member 1 is brought at opposite lateral peripheries 1b and 1b of its lower face into contact with rollers 18 and 18 of the supporting members 21 and 21 and at its opposite lateral edges 1c and 1c into contact with balls 20 and 20, with the result that the teeth portion 1a and the magnetic poles 5a, 5b, 6a and 6b are opposed with a small gap. The movable member 1 is stepwisely moved on the stator 2 by supplying electric pulses to coils 3 and 4.

The linear pulse motor above described is excellent in reduction in size, particularly thickness, and in cost, but its movable member 1 is liable to reduce its stroke during a long term operation. That is, although theoretically the displacement of the supporting members 21 and 21 is a half of the displacement of the movable member when the linear pulse motor is energized, the displacement of the former in practice becomes considerably smaller than a half of that of the latter during its long term operation due to disturbances caused by roughness of the travel path faces, dusts adhered to them, scratches produced in them, etc. Thus, the movable member 1 cannot move in the worst case.

SUMMARY OF THE INVENTION

Accordingly, it is an object of the present invention to provide a linear pulse motor which ensures the supporting mechanism of the movable member to make a half of the displacement of the movable member during a long term operation so that a predetermined displacement of the movable member is achieved.

It is another object of the present invention to provide a linear pulse motor which requires less machining accuracy of the travel path faces of the cores, the rollers of the supporting mechanism contact, than the linear pulse motor previously proposed, with a result in an increase in productivity and reduction in manufacturing cost.

With these and other objects in view, the present invention provides a linear pulse motor including: a stator; a movable member, the stator and the movable member each having a face to oppose to each other; a supporting mechanism for supporting the movable member, the supporting mechanism having a plurality of rolling members rotatably mounted thereon, said rolling members being placed between the stator and the movable member to be in rolling contact with the stator and the movable member so that a gap is formed between said opposing faces of the stator and the movable member to thereby enable the movable member to move parallel to the opposing face of the stator along a line of travel thereof, the supporting mechanism being movable on the stator along said line of travel; and a positive motion transferring mechanism for positively transferring movement of the movable member to the supporting mechanism so that the supporting mechanism is in displacement a half of the movable member, whereby the movable member is moved by generating a magnetic flux between said gap when the linear pulse motor is energized.

BRIEF DESCRIPTION OF THE DRAWINGS

The invention will now be described by way of example with reference to the accompanying drawings in which.

DETAILED DESCRIPTION OF PREFERRED EMBODIMENTS

Figure 1:
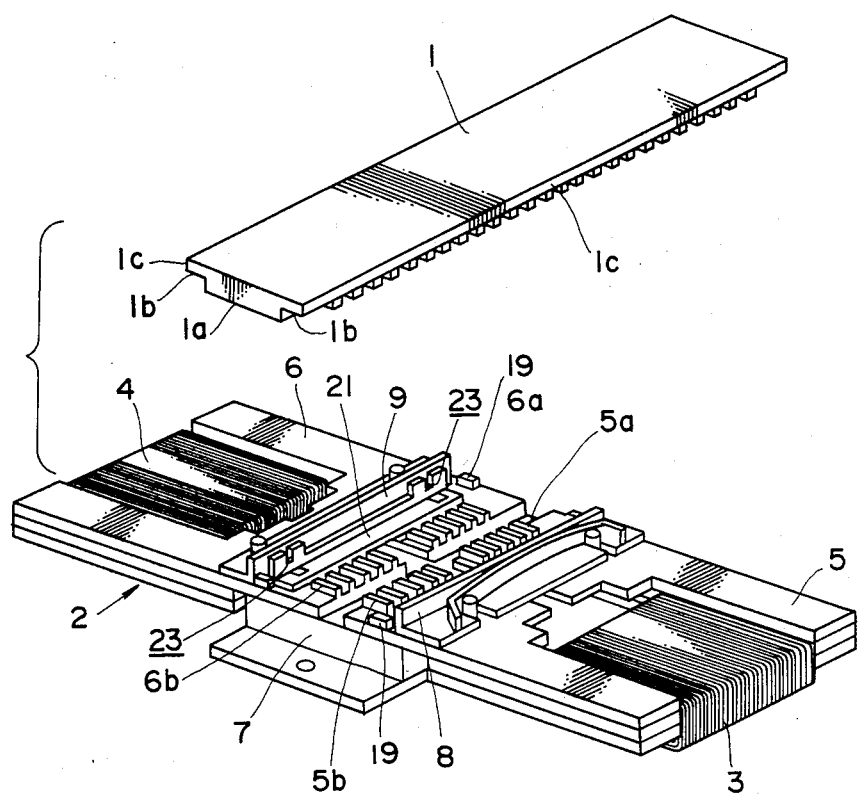
FIG. 1 is a perspective view of a linear pulse motor previously proposed.
Figure 2:
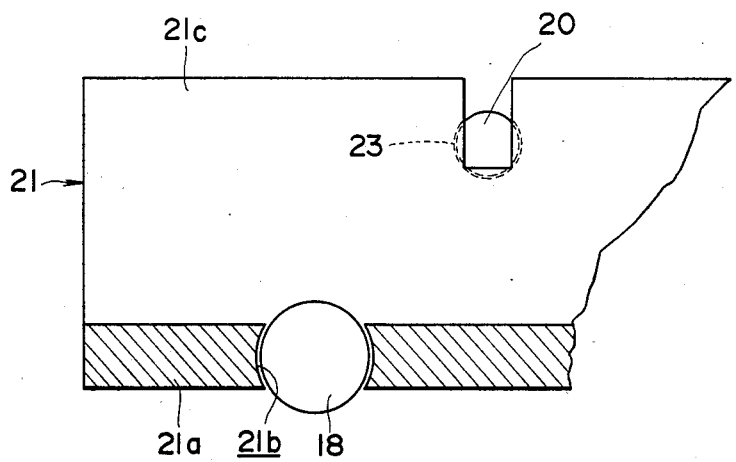
FIG. 2 is an enlarged partial view, partly in section, of the supporting member in FIG. 1.
Figure 3:
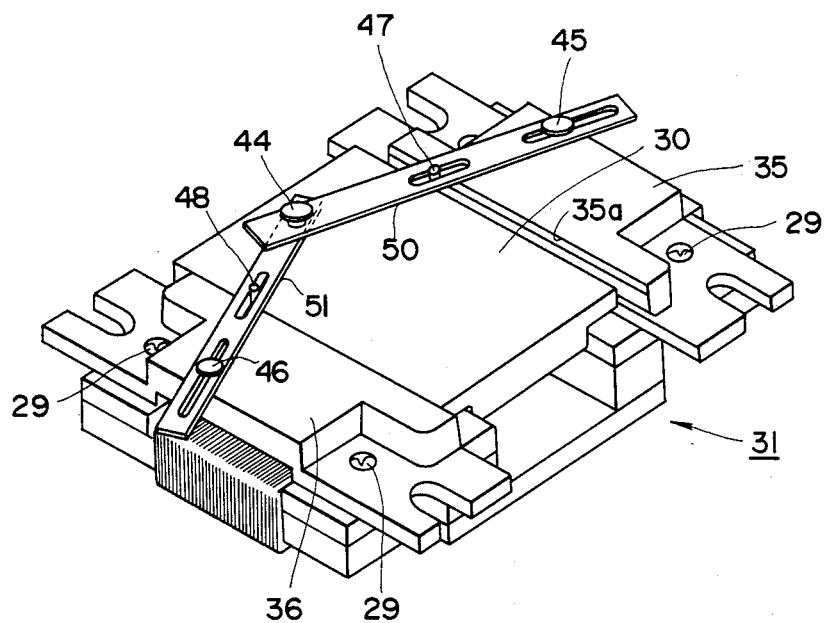
FIG. 3 is a perspective view of a linear pulse motor constructed according to the present invention.
Figure 4:
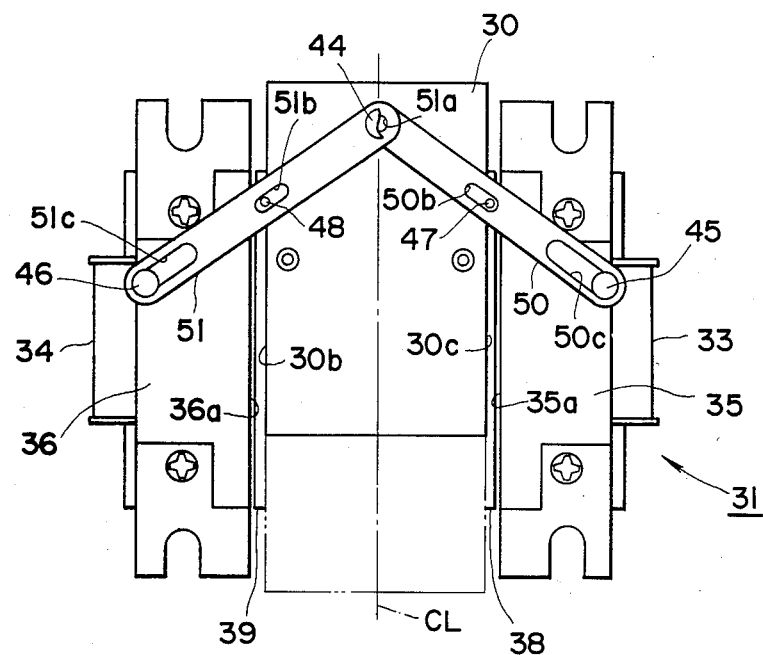
FIG. 4 is a plan view of the linear pulse motor in FIG. 3.
Figure 5:
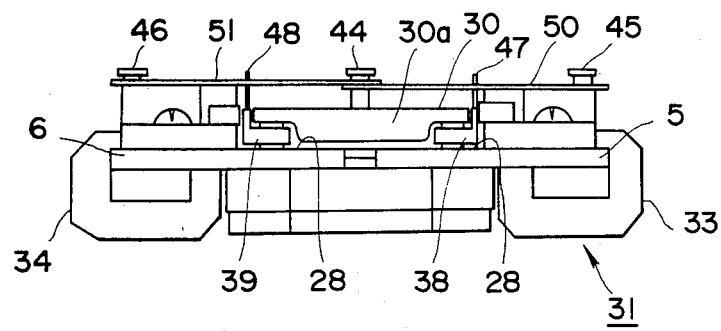
FIG. 5 is a front view of the linear pulse motor in FIG. 3.
Figure 6:
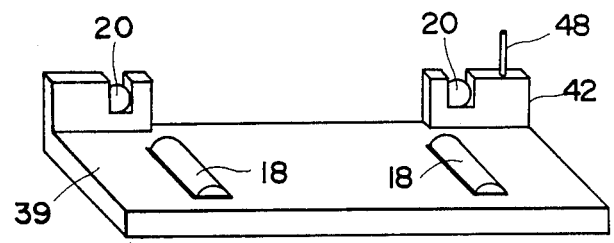
FIG. 6 is an enlarged perspective view of one of the supporting members in FIG. 5.
Figure 7:
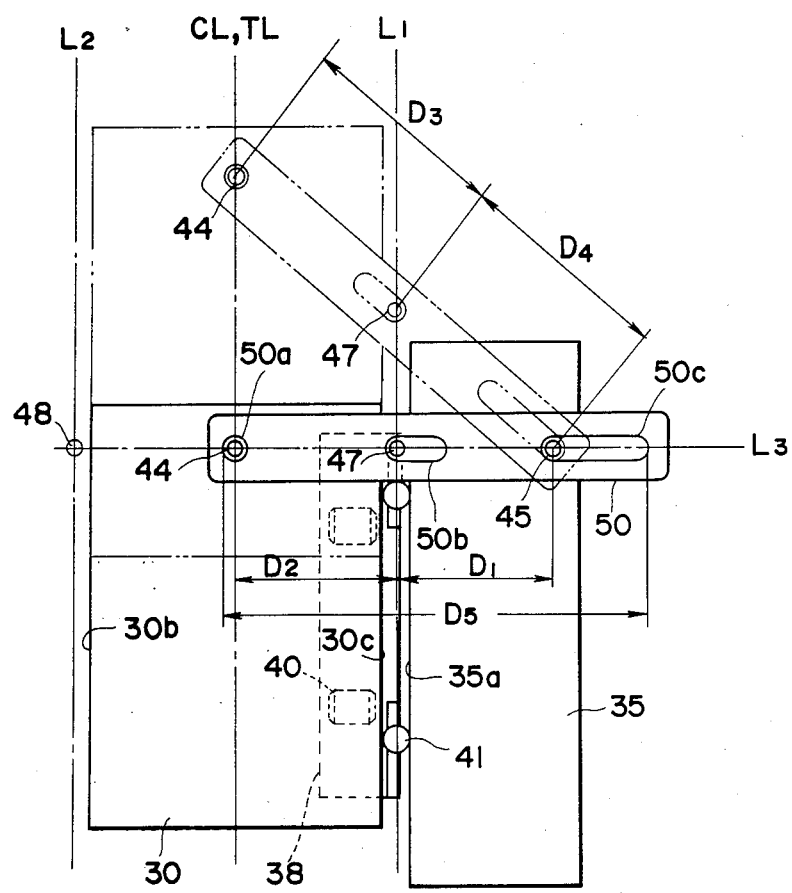
FIG. 7 is a partial diagrammatic view of the linear pulse motor in FIG. 3, illustrating displacement of one of the link members.

In the drawings, like reference numerals designate similar parts and descriptions thereof are omitted after once given. Referring to FIGS. 3-5, a stator 31 and a movable member 30 are substantially the same as the stator 2 and the movable member 1 in FIG. 1. Each core has a guide member 35 or 36 fastened to it with screws 29. Inserted between the movable member 30 and the guide members 35 and 36 are a pair of support members 38 and 39 which have substantially the same structure as the supporting members 21 except that a pin 48 is erected on an upper edge of its vertical flange 42 as clearly illustrated in FIG. 6. The support member 38 is a mirror image of the support member 39. When each of the supporting members 38 and 39 is formed of a synthetic resin, the pin 48 is integrally formed with it. The rollers 18 of each supporting member 39 are in contact with a corresponding travel path 28 and with the opposite lateral peripheries of the lower face of the movable member 30 while the balls 20 thereof are in contact with a vertical guide face 35a or 36a of corresponding guide member 35 or 36 and corresponding lateral edge 30b or 30c of the movable member 30. The movable member 30 and the guide members 35 and 36 have guide pins 44, 45 and 46 erected on them respectively, each guide pin having a head. The pin 44 rotatably passes through holes 50a and 51a respectively formed through inner ends of links 50 and 51 while the pin 45 slidably passes through a through slot 50c longitudinally formed through the outer end portion of the link 50 and the pin 46 through a through slot 51c longitudinally formed through an outer end portion of the link 51. The guide pins 47 and 48 of the supporting members 38 and 39 engage with longitudinal through slots 50b and 51b formed in intermediate portions of the links 50 and 51, respectively. The links 50 and 51 are retained by the heads of the pins 44, 45 and 46. FIG. 7 shows relative positions of pins 44, 45 and 47 and the link 50. The pin 44 is located on a center line CL of the movable member 30, the center line CL being parallel with a travel line TL of the movable member 30. The supporting members 38 and 39 travel parallel with the travel line TL and hence the pins 47 and 48 respectively move along lines L1 and L2 which are parallel with the center line CL. The pin 45 is mounted on an outer periphery of the guide member 35 at a position which is at a distance of D1 from the line L1, the distance D1 being equal to a distance D2 between the center line CL and the line L1. When the movable member 30 and the supporting member 38 are at the central position, shown by the solid line in FIG. 7, in the stator 31, the pins 44, 45 and 47 are thus on a line L3 perpendicular to the travel line LT of the movable member 30 as shown in FIG. 7. The pins 45 and 46 are located symmetrically with respect to the center line CL or a center plane passing the center of the movable member 30 as illustrated in FIG. 4. The links 50 and 51 are the same in size and configuration. As shown in FIG. 7, the pins 45 and 47 contact respectively the innermost end walls of the slots 50b and 50c of the link 50 when the movable member 30 is in the center position. On the other hand, although not illustrated, the pins 46 and 48 engage respectively with the innermost end walls of the slots 51b and 51c of the link 51. With such a construction, the supporting members 38 and 39 are forcedly moved via the links 50 and 51 when the movable member 30 is moved by energizing the linear pulse motor. When the movable member 30 travels the maximum distance as shown by the solid line in FIG. 4 and by the phantom line in FIG. 7, the pins 47 and 45 are respectively located in the outermost positions in the slots 50b and 50c while the pins 48 and 46 are in the outermost positions in the slot 51b and 51c. Also in this event, the distance D3 between the pins 44 and 47 and the distance D4 between the pins 47 and 45 are equal. Thus, the displacement of the supporting members 38 and 39 are substantially a half of the displacement of the movable member 30. The maximum displacement of the movable member 30 are restricted by the distance D5 between the hole 50a or 51a and the longitudinally outermost peripheries of the slots 50c or 51c. In this embodiment, the length of the slots 50b and 51b is a half of the length of the slots 50c and 51c.

Figure 8:
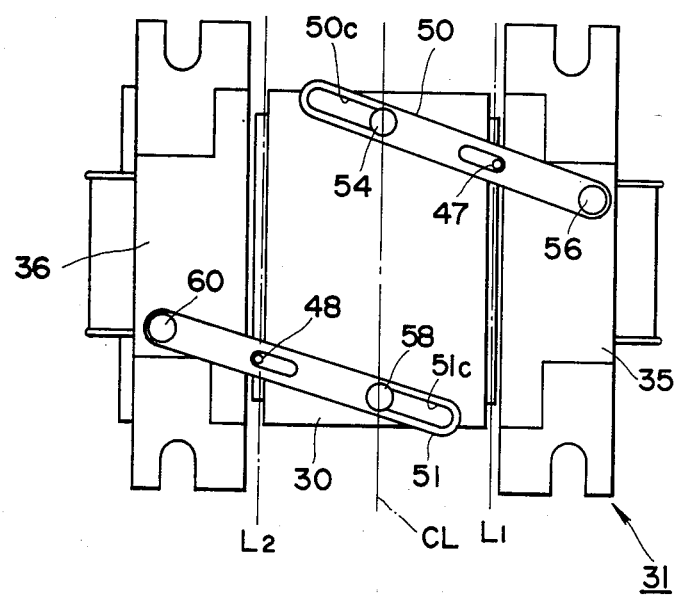
FIG. 8 is a plan view of a modified form of the linear pulse motor in FIG. 3.

In FIG. 8, links 50 and 51 are connected to the stator 31, movable member 30 and the supporting members 38 and 39 in a different manner. The pins 54 and 58 which are erected on the movable member 30 along the center line CL are inserted into the slots 50c and 51c respectively while pins 56 and 60 which are mounted on respective guide members 35 and 36 are fitted into the holes 50a and 51a. Also in this modified form, each line L1 or L2 is intermediate between the center line CL and the pin 56 or 60. The pin 54 contacts the longitudinally innermost periphery of the slot 50c when the pins 47, 54 and 56 are on a line perpendicular to the center line CL. Such is also the case with the pins 48, 58 and 60.

Figure 9:
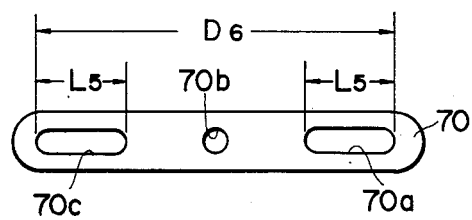
FIGS. 9 to 11 illustrate various modified forms of the link members in FIG. 3.
Figure 10:
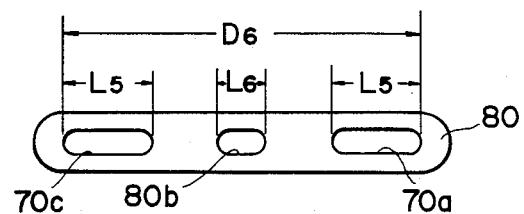
Figure 11:
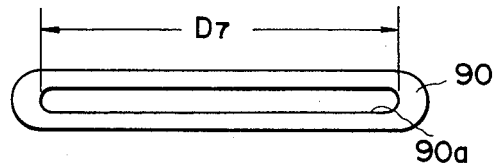

A pair of Links 70 and 70, 80 and 80 or 90 and 90 as shown in FIGS. 9 to 11 may be used in the preceding embodiments instead of the two links 50 and 51. In FIG. 9, a round hole 70b is formed through at an intermediate portion of each of links 70 and 70. In this case through slots 70a and 70c have an equal longitudinal length L5 are formed symmetrically with respect to the through hole 70b. When the links 70 are used in the first embodiment in FIGS. 3 to 5, the pin 44, pins 47 and 48 and pins 45 and 46 are fitted into the slots 70a, holes 70b and slots 70c, respectively. The maximum distance of the travel of the movable member 30 is restricted by the distance D6 between the innermost periphery of the slot 70a and the outermost periphery of the slot 70c.

In FIG. 10, a through slot 80b having a length L6 which is a half of length L5 is formed through each of the links 80 and 80 instead of the hole 70b in FIG. 9.

In FIG. 11, a single slot 90a is formed longitudinally through each of links 90 and 90. In this modification, pins 44, 45, 46, 47 and 48 are fitted into the through slots 90a when the links 90 and 90 are used in the first embodiment in FIGS. 3 to 5. Also, in this modification, the distance D7 between the opposite end peripheries of the slot 90a limits the maximum travel distance of the movable member 30.

In short, at least two of the stator 31, the movable member 30 and the guide members 35 or 36 must be slidable longitudinally with respect to the links. The holes 50a, 51a and 70b and the slots 50b, 50c, 51b, 51c, 70a, 70c, 80b and 90a serve to align corresponding pins 44, 45, 47; 44, 48, 46; 56, 47, 54; or 58, 48, 60. A single link 50, 51, 70, 80 and 90 may be used when the supporting members 38 and 39 are jointed through joints or integrally formed.

Instead of the links 50, 51, 70, 80 and 90, links having three projections may be adopted, in which case the three projections are fitted into corresponding holes or slots formed in upper faces of the movable member 30, guide members 35 and 36 and supporting member 38.

The positions of the pins 44, 45, 47; 44, 48, 46; 56, 47, 54; or 58, 48, 60 are not restricted to the positions shown in the drawings.

Figure 12:
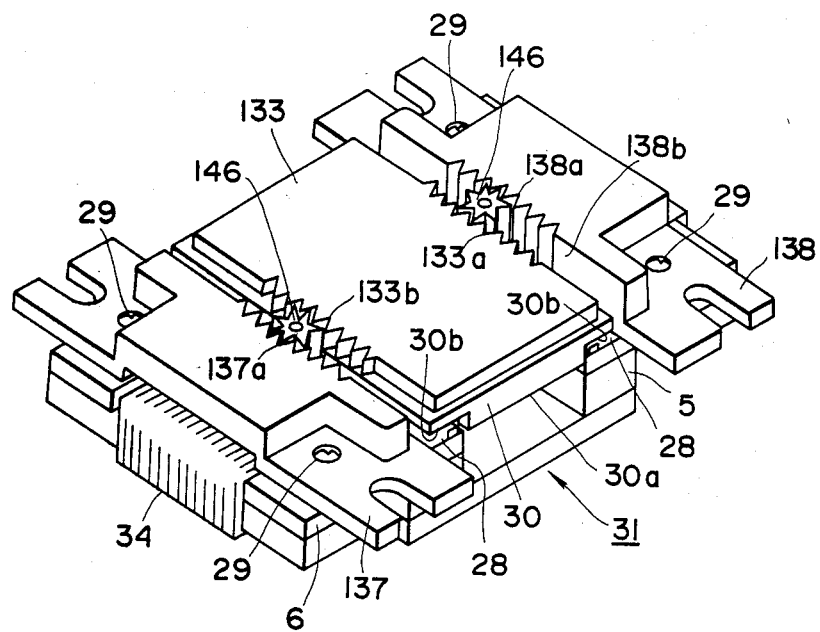
FIG. 12 is a perspective view of another embodiment of the present invention.
Figure 13:
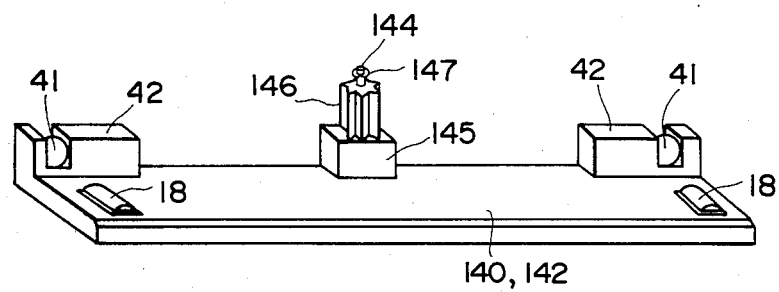
FIG. 13 is an enlarged perspective view of one of supporting members used in the linear pulse motor in FIG. 12.
Figure 14:
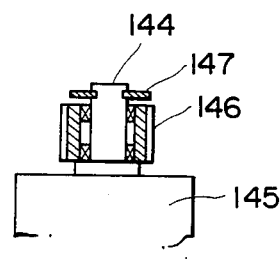
FIG. 14 is an enlarged side view, partly in section, of the pinion supporting portion of the supporting member in FIG. 13.

Another embodiment of the present invention is illustrated in FIG. 12, in which a rack plate 133 is secured on the upper face of the movable member 30 and has a pair of rack portions 133a and 133b formed in its opposite lateral edges, the rack portions 133a and 133b being equal in number and pitch of their teeth. Each of the guide members 137 and 138 has a rack portion 137a or 138a formed in an upper half of its guide face although only one guide face 138b is shown in FIG. 12, the rack portions 137a and 138a being equal in number and pitch of teeth to the rack portions 133a and 133b of the gear plate 133. In this embodiment, each of supporting members 140 and 142 has as shown in FIG. 13 a vertical supporting shaft 144 erected on an upper edge of a vertical flange 145 and a pinion 146 is rotatably fitted around the supporting shaft 144. The pinion 146 is retained in the shaft 144 by a retaining ring 147 mounted on the upper end of the shaft 144. Each supporting member 140 or 142 is placed on a a corresponding travel path 28 so that the pinion 146 meshes with corresponding rack portions 133a and 138a or 133b and 137a.

In this embodiment, the supporting members 140 and 142 are forcedly moved by the pinion-rack engagement without slip on the cores and hence the displacement of supporting members 140 and 142 is a half of the displacement of the movable member 30.

The positions of the rack portions 133a, 133b, 137a and 138a are not necessarily restricted to the positions illustrated in FIG. 12. For instance, rack portions may be provided to opposing faces of the movable member and the cores 5 and 6. For example, rack portions may be formed in the lateral peripheries 30b and 30b and the travel paths 28 and 28 facing to the lateral peripheries, in which case the pinion 146 is supported on each supporting member to rotate about a horizontal axis and to mesh with the rack portions.

The slide bearing used in the machine tools has the same problem of the present invention and hence the present invention may be applied to such a use.

While the invention has been disclosed in specific detail for purposes of clarity and complete disclosure, the appended claims are intended to include within their meaning all modifications and changes that come within the true scope of the invention.

What is claimed is:

1. A linear pulse motor comprising:
   a stator;
   a movable member, the stator and the movable member each having a face to oppose to each other;
   supporting means for supporting the movable member, the supporting means having a plurality of rolling members rotatably mounted thereon, said rolling members being placed between the stator and the movable member to be in rolling contact with the stator and the movable member so that a gap is formed between said opposing faces of the stator and the movable member to thereby enable the movable member to move parallel to the opposing face of the stator along a line of travel thereof, the supporting means being movable on the stator along said line of travel; and
   positive motion transferring means for positively transferring movement of the movable member to the supporting means so that the supporting means is in displacement a half of the movable member, whereby the movable member is moved by generating a magnetic flux between said gap when the linear pulse motor is energized.

2. A linear pulse motor as recited in claim 1, wherein the positive motion means comprises an elongated member and connecting means for rotatably connecting the stator, the movable member and the supporting means to said elongated member at equal intervals so that so that at least two of the stator, the movable member and the supporting means are slidable in a longitudinal direction of the elongated member.

3. A linear pulse motor as recited in claim 2, wherein said connecting means comprises three openings formed through said elongated member and a projection formed with each of the stator, the movable member and the supporting means, each projection rotatably fitted into a corresponding opening, and wherein at least two of the three openings are narrow openings extending in the longitudinal direction of elongated member for slidably guide corresponding projections fitted therein.

4. A linear pulse motor as recited in claim 3, wherein said connecting means comprises a through slot formed longitudinally through said elongated member and a projection formed with each of the stator, the movable member and the supporting means, each projection fitted rotatably into said through slot to be slidable along said through slot.

5. A linear pulse motor as recited in claim 4, wherein the positive motion means comprises a first rack formed in the stator, a second rack formed in the movable member to face said first rack and a pinion rotatably mounted on the supporting means to mesh with both said first rack and said second rack.

* * * * *